United States Patent
Bian et al.

(10) Patent No.: US 10,816,725 B2
(45) Date of Patent: Oct. 27, 2020

(54) WAVEGUIDE INTERSECTIONS INCORPORATING A WAVEGUIDE CROSSING

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US); Abu Thomas, Brookline, MA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/134,295

(22) Filed: Sep. 18, 2018

(65) Prior Publication Data

US 2020/0088942 A1    Mar. 19, 2020

(51) Int. Cl.
*G02B 6/122* (2006.01)
*G02B 6/125* (2006.01)
*G02B 6/12* (2006.01)

(52) U.S. Cl.
CPC .......... *G02B 6/1228* (2013.01); *G02B 6/125* (2013.01); *G02B 2006/12061* (2013.01); *G02B 2006/12176* (2013.01); *G02B 2006/12195* (2013.01)

(58) Field of Classification Search
CPC ............................. G02B 6/125; G02B 6/1228
See application file for complete search history.

(56) References Cited

U.S. PATENT DOCUMENTS

| | | | | |
|---|---|---|---|---|
| 6,801,690 B1 * | 10/2004 | Ling | ................ | G02B 6/12002 385/129 |
| 7,184,631 B2 * | 2/2007 | Mitomi | ................ | G02B 6/1228 385/39 |
| 8,238,704 B2 * | 8/2012 | Ben Bakir | ........... | G02B 6/1228 216/24 |
| 8,873,906 B2 * | 10/2014 | Tokushima | .......... | G02B 6/1228 264/1.25 |
| 9,709,738 B1 * | 7/2017 | Dumais | .................... | G02B 6/14 |
| 2005/0213873 A1 * | 9/2005 | Piede | ................. | G02B 6/12004 385/14 |
| 2006/0039647 A1 * | 2/2006 | Ling | ................. | G02B 6/12007 385/24 |

(Continued)

OTHER PUBLICATIONS

Jones et al., "Ultra-low crosstalk, CMOS compatible waveguide crossings for densely integrated photonic interconnection networks," Opt. Express 21, 12002-12013 (2013).

(Continued)

*Primary Examiner* — Omar R Rojas
(74) *Attorney, Agent, or Firm* — Thompson Hine LLP; Anthony Canale (57) ABSTRACT

Structures with waveguides in multiple levels and methods of fabricating a structure that includes waveguides in multiple levels. A waveguide crossing has a first waveguide and a second waveguide arranged to intersect the first waveguide. A third waveguide is displaced vertically from the waveguide crossing, The third waveguide includes a portion having an overlapping arrangement with a portion of the first waveguide. The overlapping portions of the first and third waveguides are configured to transfer optical signals between the first waveguide and the third waveguide.

4 Claims, 6 Drawing Sheets

(56) References Cited

U.S. PATENT DOCUMENTS

| | | | | |
|---|---|---|---|---|
| 2009/0297093 A1* | 12/2009 | Webster | ............... | G02B 6/1228 |
| | | | | 385/14 |
| 2013/0108208 A1 | 5/2013 | Doerr | | |
| 2017/0227713 A1* | 8/2017 | Okayama | ........... | G02B 6/12016 |
| 2017/0254951 A1 | 9/2017 | Dumais et al. | | |
| 2019/0146153 A1* | 5/2019 | Park | ..................... | G02B 6/1228 |
| | | | | 385/43 |

OTHER PUBLICATIONS

Sacher et al., "Tri-layer silicon nitride-on-silicon photonic platform for ultra-low-loss crossings and interlayer transitions," Opt. Express 25, 30862-30875 (2017).

Shang et al., "Low-loss compact multilayer silicon nitride platform for 3D photonic integrated circuits," Opt. Express 23, 21334-21342 (2015).

* cited by examiner

WAVEGUIDE INTERSECTIONS INCORPORATING A WAVEGUIDE CROSSING

BACKGROUND

The present invention relates to photonics chips and, more specifically, to structures with waveguides in multiple levels and methods of fabricating a structure that includes waveguides in multiple levels.

Photonic chips are used in many applications and systems including, but not limited to, data communication systems and data computation systems. A photonic chip integrates optical components, such as waveguides, and electronic components, such as field-effect transistors, into a unified platform. Layout area, cost, and operational overhead, among other factors, may be reduced by integrating both types of components on a single photonics chip.

The waveguides of a photonics chip may be arranged in multiple levels. For example, waveguides may be formed in a lower level by patterning the device layer of a silicon-on-insulator wafer, and other waveguides may be formed in an upper level by patterning a deposited layer of a different material such as silicon nitride. In the waveguide layout, a waveguide in the upper level may be routed directly over and across a waveguide in the lower level. Such direct crossings in the waveguide layout may result in significantly increased insertion loss and high cross-talk due to strong scattering induced by the close proximity of the waveguides in the different levels.

Improved structures with waveguides in multiple levels and methods of fabricating a structure that includes waveguides in multiple levels are needed.

SUMMARY

In an embodiment of the invention, a structure includes a waveguide crossing having a first waveguide and a second waveguide arranged to intersect the first waveguide. The structure further includes a third waveguide arranged in a vertical direction relative to from the waveguide crossing. The third waveguide includes a portion having an overlapping arrangement with a portion of the first waveguide. The overlapping portions of the first and third waveguides are configured to transfer optical signals between the first waveguide and the third waveguide.

In an embodiment of the invention, a method is provided of forming a waveguide arrangement. The method includes patterning a first layer to form a waveguide crossing including a first waveguide and a second waveguide arranged to intersect the first waveguide. The method further includes patterning a second layer to form a third waveguide that is arranged in a vertical direction relative to the waveguide crossing and that includes a portion having an overlapping arrangement with a portion of the first waveguide. The overlapping portions of the first and third waveguides are configured to transfer optical signals between the first waveguide and the third waveguide.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like feature in the various views.

DETAILED DESCRIPTION

Figure 1:
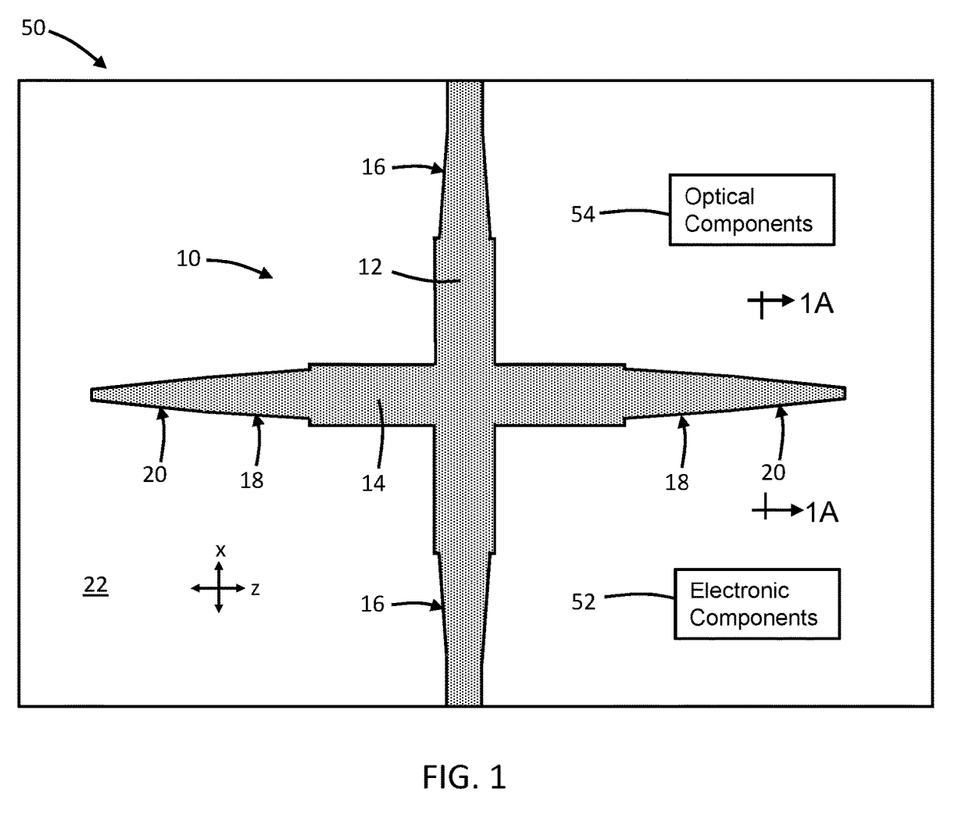
FIG. 1 is a top view of a photonics chip including a waveguide arrangement at an initial fabrication stage of a processing method in accordance with embodiments of the invention.
Figure 1A:
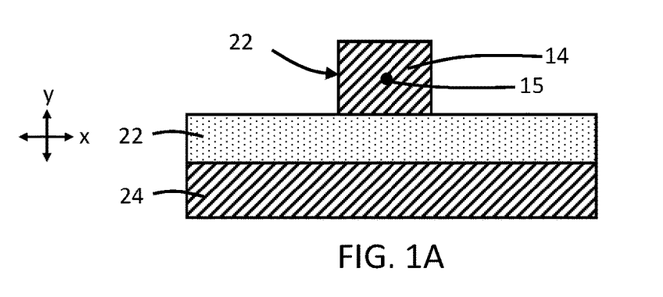
FIG. 1A is a cross-sectional view of the waveguide arrangement taken generally along line 1A-1A in FIG. 1.

With reference to FIGS. 1, 1A and in accordance with embodiments of the invention, a structure 10 includes a waveguide 12 and a waveguide 14 that is aligned to intersect the waveguide 12 to define a waveguide crossing. The waveguide 14 may extend lengthwise along a longitudinal axis 15 that is oriented transverse to a longitudinal axis of the waveguide 12. In an embodiment, the longitudinal axes of the waveguides 12, 14 may be oriented relative to each other such that the waveguides 12, 14 orthogonally intersect with included right angles. The waveguide 12 may include tapers 16 that narrow its width at its entrance and exit points to the waveguide crossing.

The waveguide 14 includes tapers 18 and tapers 20 that are arranged as sets of compound taper structures at the opposite ends or tips terminating a central straight section of the waveguide 14. For each taper structure, the taper 18 is arranged along the longitudinal axis 15 of the waveguide 14 between the taper 20 and the central straight section of the waveguide 14. The tapers 18 may narrow along the longitudinal axis 15 of the waveguide 14 in a direction toward the opposite tips of the waveguide 14. Similarly, the tapers 20 may narrow along the longitudinal axis 15 of the waveguide 14 in a direction toward the respective opposite tips of the waveguide 14, and may have a taper angle that is greater than the taper angle of the tapers 18. Additional tapers (not shown) may be added to the compound taper structures. As used herein, the term "straight" in conjunction with a feature refers to a non-tapered feature.

The waveguides 12, 14 may be composed of single-crystal semiconductor material (e.g., single-crystal silicon). The waveguides 12, 14 may be formed by patterning a device layer of a silicon-on-insulator (SOI) substrate with lithography and etching processes that form an etch mask over the device layer and etch the masked device layer with an etching process, such as reactive ion etching (ME). The waveguides 12, 14 may be arranged on a buried insulator layer 22 of the SOI substrate. The buried insulator layer 22 may be composed of a dielectric material, such as silicon dioxide (e.g., $SiO_2$), and is arranged over a handle wafer 24 of the SOI substrate. The buried insulator layer 22 may operate as a lower cladding providing confinement for the waveguides 12, 14 of the structure 10.

Figure 2:
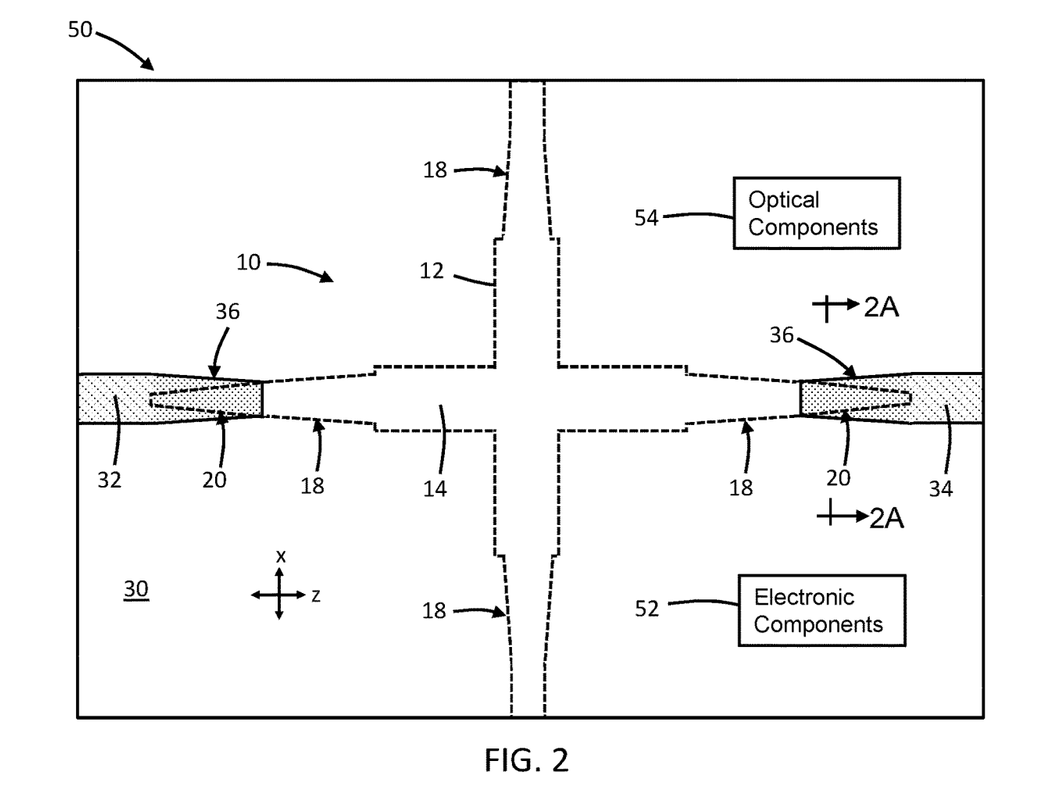
FIG. 2 is a top view of the photonics chip at a fabrication stage of the processing method subsequent to FIGS. 1, 1A.
Figure 2A:
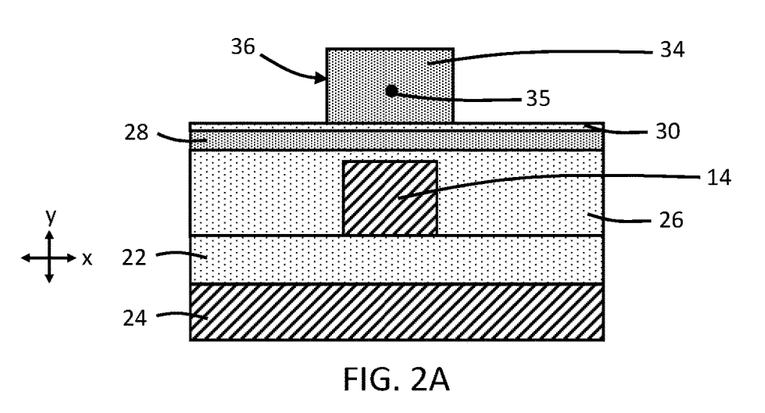
FIG. 2A is a cross-sectional view of the waveguide arrangement taken generally along line 2A-2A in FIG. 2.

With reference to FIGS. 2, 2A in which like reference numerals refer to like features in FIGS. 1, 1A and at a subsequent fabrication stage of the processing method, a layer stack including dielectric layers 26, 28, 30 is formed over the waveguides 12, 14. The dielectric layer 26 and the dielectric layer 30 may be composed of a dielectric material, such as silicon dioxide ($SiO_2$), deposited by atomic layer deposition (ALD) or chemical vapor deposition (CVD). The dielectric layer 28 may be composed of a different dielectric material, such as silicon nitride, deposited by atomic layer deposition or chemical vapor deposition.

Waveguides 32, 34 are formed over the dielectric layer 30 and extend lengthwise along respective longitudinal axes 35 that may be aligned coaxial with each other and aligned parallel with the longitudinal axis 15 of the waveguide 14. The waveguides 32, 34 are arranged in a vertical direction over the waveguides 12, 14 forming the waveguide crossing such that the waveguides 32, 34 are located in a different plane than the waveguides 12, 14. The waveguides 32, 34 each include tapers 36 that are arranged at the opposite ends or tips terminating respective straight sections of the waveguides 32, 34. The tapers 36 may narrow in width along the longitudinal axes 35 of the waveguides 32, 34 in a direction toward the tips of the waveguides 32, 34. The taper of the tapers 36 along the longitudinal axes 35 of the waveguides 32, 34 toward their respective tips is inverse to the taper of the tapers 20 along the longitudinal axis 15 of the waveguide 14.

Figure 2B:
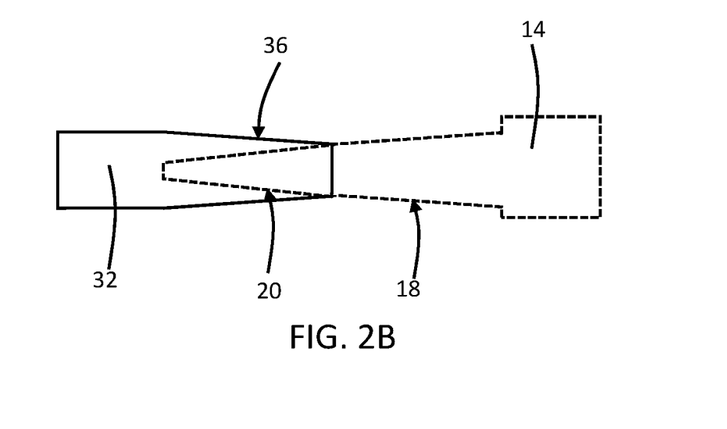
FIG. 2B is an enlarged view of a portion of FIG. 2.

The tapers 36 and the tapers 20 provide waveguide couplers that are configured to transfer optical signals from the waveguide 32 to the waveguide 14 and from the waveguide 14 to the waveguide 34. The tapers 36 of the waveguides 32, 34 are arranged over the respective tapers 20 of the waveguide 14. The tapers 36 may be arranged along the longitudinal axes 35 of the waveguides 32, 34 to overlap with the tapers 20 of waveguide 14. In an embodiment, the tapers 36 may be arranged along the longitudinal axes 35 to fully overlap in length with the tapers 20 of waveguide 14. In an alternative embodiment, the tapers 36 may be arranged along the longitudinal axes 35 to partially overlap in length with the tapers 20 of waveguide 14. In an embodiment in which the tapers 36 fully overlap with the tapers 20, the tapers 36 of waveguides 32, 34 may not overlap with the tapers 18 of the waveguide 14 along the longitudinal axes 35.

Figure 2C:
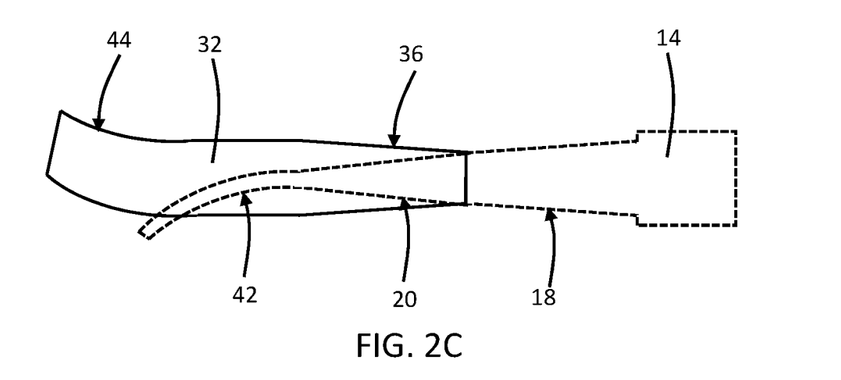
FIG. 2C is an enlarged view similar to FIG. 2B of a portion of a waveguide arrangement in accordance with alternative embodiments of the invention.

In an alternative embodiment and as shown in FIG. 2C, the waveguide 14 may include an added bend 42 connected with one or both of the tapers 20 such that each added bend terminates the waveguide 14. In an alternative embodiment, one or both of the waveguides 32, 34 may include a bend 44 that is connected with the taper 36. Each added bend 42, 44 may have a positive curvature or a negative curvature.

In an embodiment, the waveguides 32, 34 may be composed of a dielectric material, such as a nitride of silicon (e.g., silicon nitride), that is deposited by chemical vapor deposition over the dielectric layer 30 and then patterned by lithography and etching processes in which an etch mask is formed over the deposited layer and the masked deposited layer is etched with an etching process, such as reactive ion etching (RIE). The etching process may be selected to stop on the material of the dielectric layer 30 after penetrating fully through the deposited layer.

Figure 3:
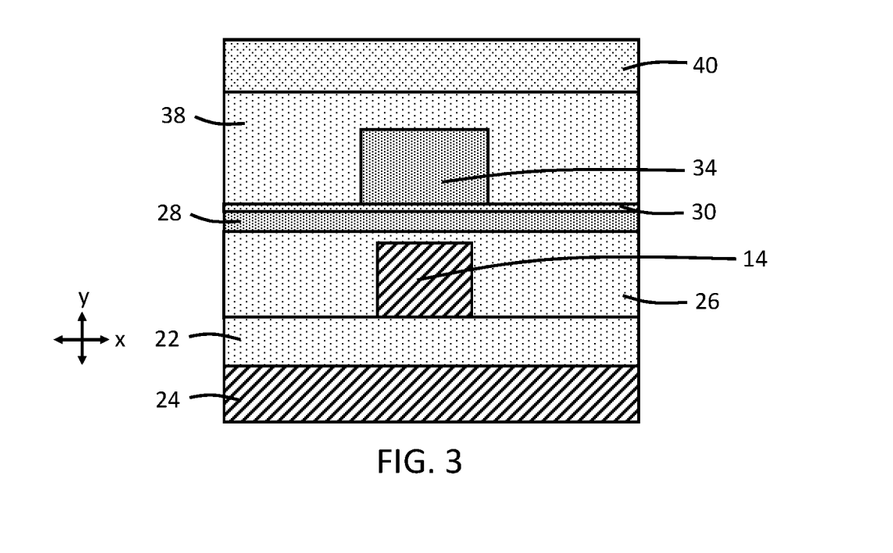
FIG. 3 is a cross-sectional view of the waveguide arrangement at a fabrication stage of the processing method subsequent to FIGS. 2, 2A, 2B.

With reference to FIG. 3 in which like reference numerals refer to like features in FIGS. 2, 2A and at a subsequent fabrication stage of the processing method, a gap-fill layer 38 is formed that covers the waveguides 32, 34 and dielectric layer 30. The gap-fill layer 38 may be composed of a dielectric material, such as silicon dioxide ($SiO_2$), deposited by chemical vapor deposition. The gap-fill layer 38 may be formed by depositing a layer of its constituent dielectric material and planarizing the deposited layer with, for example, chemical mechanical polishing (CMP). For example, the gap-fill layer 38 may be composed of silicon dioxide ($SiO_2$) deposited by chemical vapor deposition using ozone ($O_2$) and tetraethylorthosilicate (TEOS) as reactants.

A back-end-of-line stack, generally indicated by reference numeral 40, may be formed over the gap-fill layer 38. The back-end-of-line stack 40 may include one or more interlayer dielectric layers composed of dielectric materials. The back-end-of-line stack 40 may also include metallization composed of, for example, copper or cobalt that may be arranged in the one or more interlayer dielectric layers.

The structure 10, in any of its embodiments described herein, may be integrated into a photonics chip 50 (FIGS. 1, 2) that includes electronic components 52 in the lower level with the waveguides 12, 14 and additional optical components 54 in both levels. The electronic components 52 may include field-effect transistors that are fabricated by CMOS front-end-of-line processing using the device layer of the SOI substrate.

During operation of the photonics chip, optical signals may be communicated between the waveguide 32 and the waveguide 34 through the waveguide 14. For example, optical signals propagating in waveguide 32 and arriving at structure 10 may transfer downwardly from the taper 36 of waveguide 32 to the taper 20 at one end of waveguide 14, propagate along the longitudinal axis of waveguide 14, transfer upwardly from the taper 20 at the opposite end of waveguide 14 to the taper 36 of waveguide 34, and continuation propagation alone waveguide 34 away from the structure 10. Optical signals propagating in waveguide 12 may pass through the structure 10 unimpeded by the intersecting waveguide 14.

The structure 10 may be used at waveguide intersections to permit crosses of waveguides in different levels with reduced scattering and, therefore, significantly reduced insertion loss and lessened cross-talk due to reduction in scattering, which contrasts with conventional waveguide arrangements in which a waveguide arranged in the upper level merely crosses over a waveguide arranged in the lower level. The structure 10 eliminates such conventional waveguide arrangements with reliance upon a waveguide crossing and by temporarily transferring the propagating optical signals in the waveguides 32, 34 to the waveguide crossing.

Figure 4:
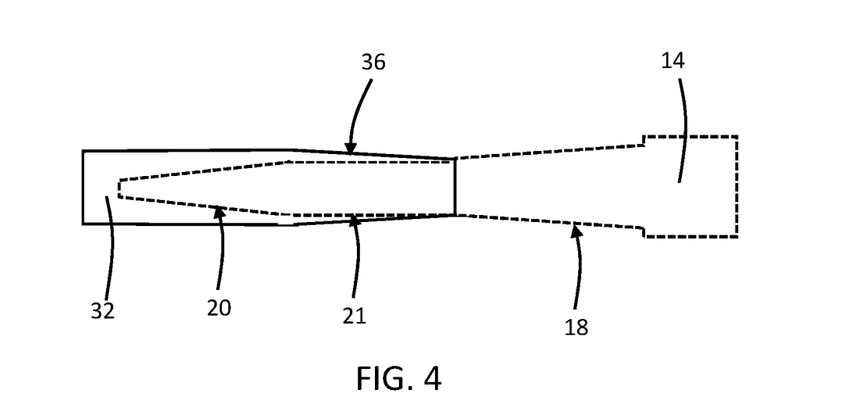
FIGS. 4-5 are top views similar to FIG. 2B in accordance with alternative embodiments of the invention.

With reference to FIG. 4 in which like reference numerals refer to like features in FIG. 2B and at a subsequent fabrication stage of the processing method, the taper 36 of waveguide 32 is positioned along the longitudinal axis 35 relative to taper 20 to provide a set of cascaded tapers 20, 36. The taper 20 of waveguide 14 is arranged along the longitudinal axis 15 beneath a portion of the straight section of the waveguide 32. A straight section 21 of the waveguide 14 is added to the waveguide 14 as a portion arranged along the longitudinal axis 15 between the taper 18 and the taper 20. The taper 36 of the waveguide 32 is arranged along the longitudinal axis over the straight section 21 of the waveguide 14. A similar arrangement of features is provided between the taper 20 at the opposite end of waveguide 14 and the taper 36 terminating waveguide 34.

In an alternative embodiment, the waveguide 14 may include an added bend similar to bend 42 (FIG. 2C) connected with one or both of the tapers 20 such that each added bend terminates the waveguide 14. In an alternative embodiment, one or both of the waveguides 32, 34 may include a bend similar to bend 44 (FIG. 2C) that is connected with the taper 36. Each added bend may have a positive curvature or a negative curvature.

Figure 5:
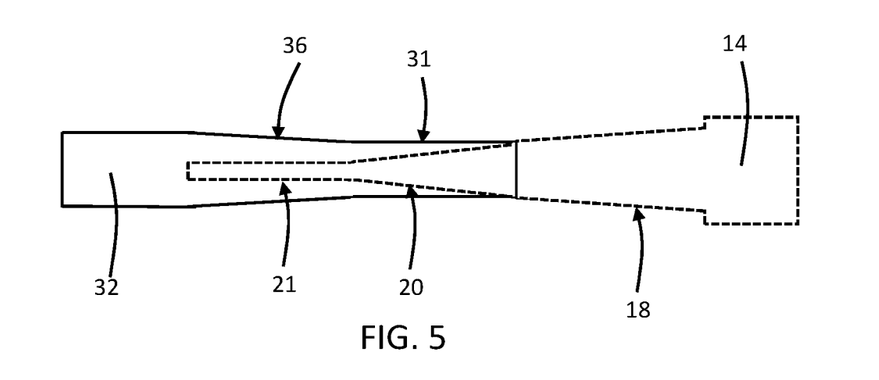

With reference to FIG. 5 in which like reference numerals refer to like features in FIG. 4 and in accordance with alternative embodiments of the invention, the straight section 21 of the waveguide 14 may be appended to the taper 20 such that the straight section 21 terminates the waveguide 14. Similarly, the waveguide 32 may be modified to add a straight section 31 appended to the taper 36 and that terminates the waveguide 14. In the cascaded arrangement, the taper 20 of waveguide 14 is arranged along the longitudinal axis 15 beneath the straight section 31 of the waveguide 32, and the taper 36 of the waveguide 32 is arranged along the longitudinal axis 135 over the straight section 21 of the waveguide 14. A similar arrangement of features is provided between the taper 20 at the opposite end of waveguide 14 and the taper 36 terminating waveguide 34.

In an alternative embodiment, the waveguide 14 may include an added bend similar to bend 42 (FIG. 2C) connected with one or both of the tapers 20 such that each added bend terminates the waveguide 14. In an alternative embodiment, one or both of the waveguides 32, 34 may include a bend similar to bend 44 (FIG. 2C) that is connected with the taper 36. Each added bend may have a positive curvature or a negative curvature.

Figure 6:
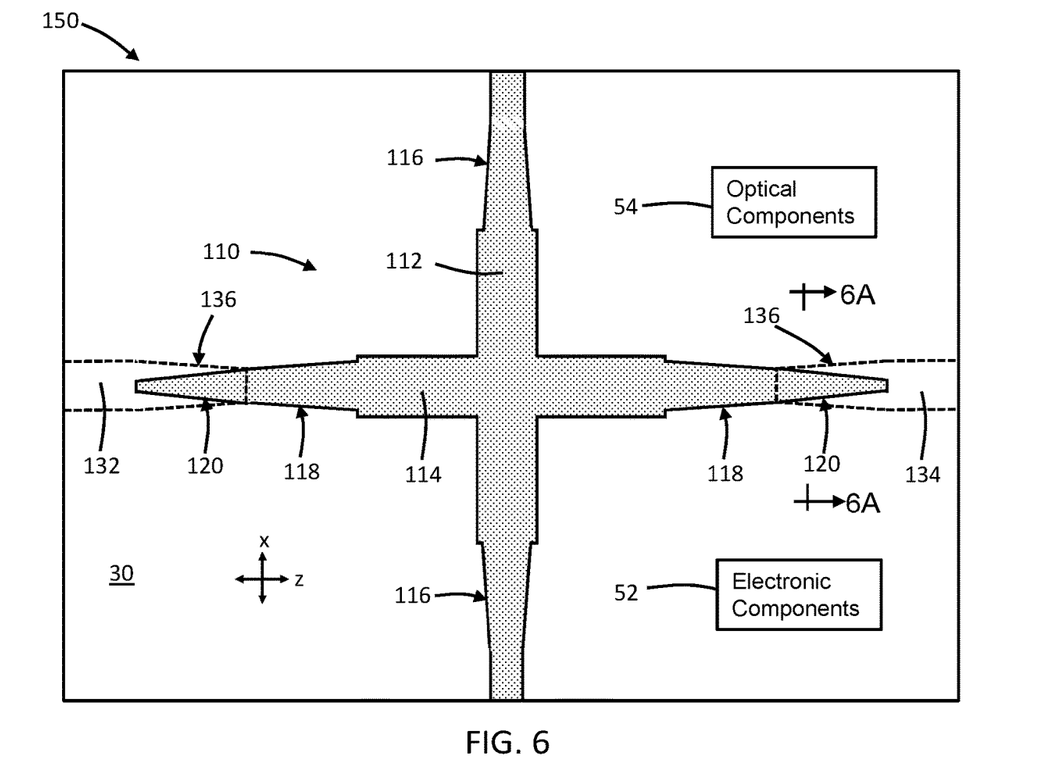
FIG. 6 is a top view of a photonics chip including a waveguide arrangement in accordance with alternative embodiments of the invention.
Figure 6A:
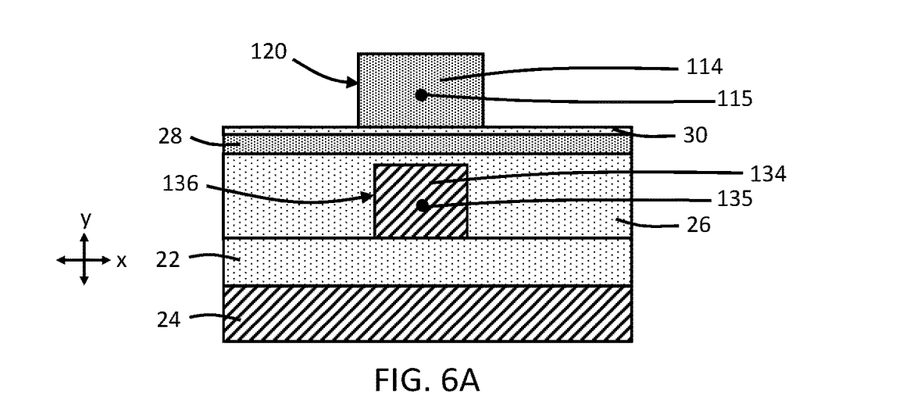
FIG. 6A is a cross-sectional view of the waveguide arrangement taken generally along line 6A-6A in FIG. 6.
Figure 6B:
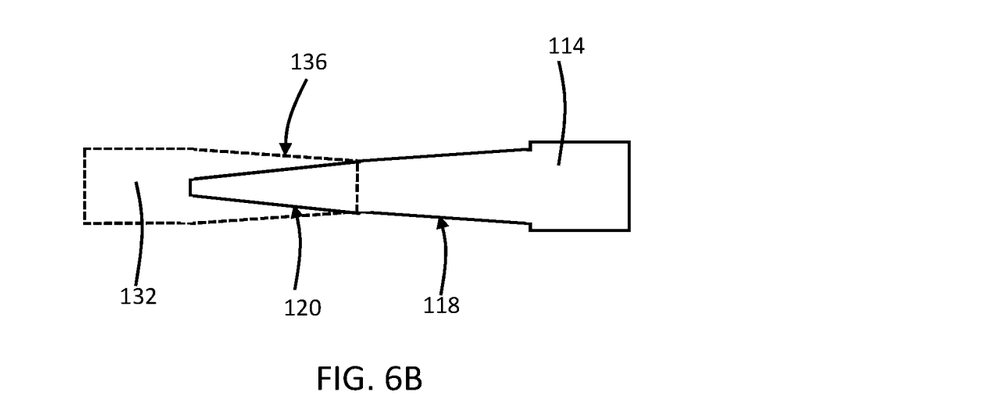
FIG. 6B is an enlarged view of a portion of FIG. 6.

With reference to FIGS. 6, 6A, 6B in which like reference numerals refer to like features in FIGS. 2, 2A and in accordance with alternative embodiments of the invention, a structure 110 for a photonics chip 150 includes waveguides 112, 114 that are positioned over the dielectric layer 30 and waveguides 132, 134 that are positioned over the buried insulator layer 22. The waveguide 114 is aligned to intersect the waveguide 112 to define a waveguide crossing. The dielectric layers 28, 30 and a thin portion of the dielectric layer 26 are arranged in a vertical direction between the waveguides 112, 114 and the waveguides 132, 134.

The waveguide 114 may extend lengthwise along a longitudinal axis 115 that is oriented transverse to a longitudinal axis of the waveguide 112. In an embodiment, the longitudinal axes of the waveguides 112, 114 may be oriented relative to each other such that the waveguides 112, 114 orthogonally intersect with included right angles. The waveguide 112 may include tapers 16 that narrow its width at its entrance and exit points to the waveguide crossing.

The waveguide 114 includes sets of tapers 118 and tapers 120 that are arranged as compound taper structures at the opposite ends or tips terminating the waveguide 114. For each taper structure, the taper 118 is arranged along the longitudinal axis 115 of the waveguide 114 between the taper 120 and the straight central section of the waveguide 114. The tapers 118 may narrow along the longitudinal axis 115 in a direction toward the opposite tips of the waveguide 114. Similarly, the tapers 120 may narrow along the longitudinal axis 115 of the waveguide 114 in a direction toward the respective opposite tips of the waveguide 114, and may have a taper angle that is greater than the taper angle of the tapers 118. Additional tapers (not shown) may be added to the compound taper structures.

The waveguides 112, 114 may be composed of a dielectric material, such as a nitride of silicon (e.g., silicon nitride), that is deposited by chemical vapor deposition over the dielectric layer 30 and then patterned by lithography and etching processes in which an etch mask is formed over the deposited layer and the masked deposited layer is etched with an etching process, such as reactive ion etching (RIE). The etching process may be selected to stop on the material of the dielectric layer 30 after penetrating fully through the deposited layer.

Waveguides 132, 134 may extend lengthwise along respective longitudinal axes 135 that may be aligned coaxial with each other and aligned parallel with the longitudinal axis 115 of the waveguide 114. The waveguides 112, 114 forming the waveguide crossing are arranged in a vertical direction over the waveguides 132, 134 such that the waveguides 112, 114 are located in a different plane than the waveguides 132, 134. The waveguides 132, 134 includes tapers 136 that are arranged at the opposite ends or tips terminating respective straight sections of the waveguides 132, 134. The tapers 136 may narrow in width along the longitudinal axes 135 of the waveguides 132, 134 in a direction toward the tips of the waveguides 132, 134. The taper of the tapers 136 along the longitudinal axes 135 of the waveguides 132, 134 toward their respective tips is inverse to the taper of the tapers 120 along the longitudinal axis 115 of the waveguide 114.

The tapers 136 and the tapers 120 provide waveguide couplers that are configured to transfer optical signals from the waveguide 132 to the waveguide 114 and from the waveguide 114 to the waveguide 134. The tapers 36 of the waveguides 32, 34 are arranged under the respective tapers 20 of the waveguide 14. The tapers 136 may be arranged along the longitudinal axes 135 of the waveguides 132, 134 to overlap with the tapers 120 of waveguide 114. In an embodiment, the tapers 136 may be arranged along the longitudinal axes 135 to fully overlap in length with the tapers 120 of waveguide 114. In an alternative embodiment, the tapers 136 may be arranged along the longitudinal axes 135 to partially overlap in length with the tapers 120 of waveguide 114. In an embodiment in which the tapers 136 fully overlap with the tapers 120, the tapers 136 of waveguides 132, 134 may not overlap with the tapers 118 of the waveguide 114 along the longitudinal axes 135.

In an alternative embodiment, the waveguide 114 may include an added bend similar to bend 42 (FIG. 2C) connected with one or both of the tapers 120 such that each added bend terminates the waveguide 114. In an alternative embodiment, one or both of the waveguides 132, 134 may include a bend similar to bend 44 (FIG. 2C) that is connected with the taper 136. Each added bend may have a positive curvature or a negative curvature.

In an embodiment, the waveguides 132, 134 may be formed by patterning the single-crystal semiconductor material (e.g., single-crystal silicon) constituting the device layer of a silicon-on-insulator (SOI) substrate with lithography and etching processes that forms an etch mask over the device layer and etches the masked device layer with an etching process, such as reactive ion etching (RIE).

Processing continues as described in the context of FIG. 3 to form the gap-fill layer 38 and the back-end-of-line stack 40 over the structure 110.

Figure 7:
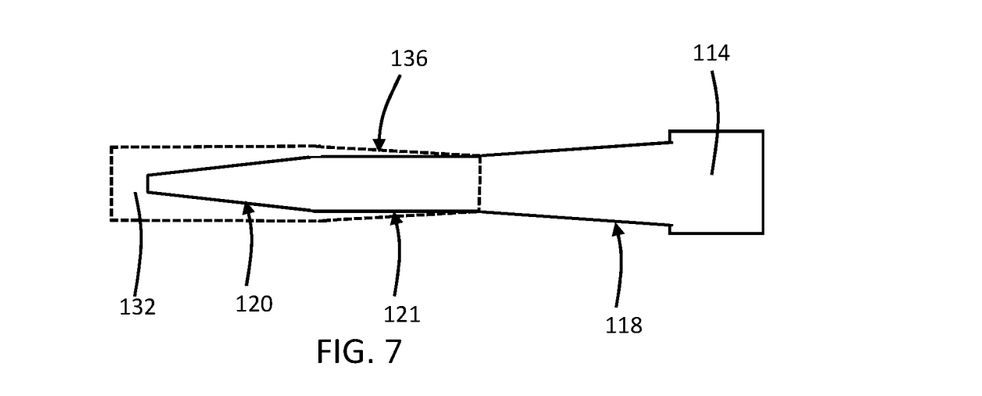
FIGS. 7-8 are top views similar to FIG. 6B in accordance with alternative embodiments of the invention.

With reference to FIG. 7 in which like reference numerals refer to like features in FIG. 6B and at a subsequent fabrication stage of the processing method, the taper 136 of waveguide 132 is positioned along the longitudinal axis 135 relative to taper 120 to provide a set of cascaded tapers 120, 136. The taper 120 of waveguide 114 is arranged along the longitudinal axis 115 over a portion of the straight section of the waveguide 132. A straight section 121 is added to the waveguide 114 as a portion is arranged along the longitudinal axis 115 between the taper 118 and the taper 120. The taper 136 of the waveguide 132 is arranged along the longitudinal axis under the straight section 21 of the waveguide 114. A similar arrangement of features is provided between the taper 120 at the opposite end of waveguide 114 and the taper 136 terminating waveguide 134.

In an alternative embodiment, the waveguide 114 may include an added bend similar to bend 42 (FIG. 2C) connected with one or both of the tapers 120 such that each added bend terminates the waveguide 114. In an alternative embodiment, one or both of the waveguides 132, 134 may include a bend similar to bend 44 (FIG. 2C) that is connected with the taper 136. Each added bend may have a positive curvature or a negative curvature.

Figure 8:
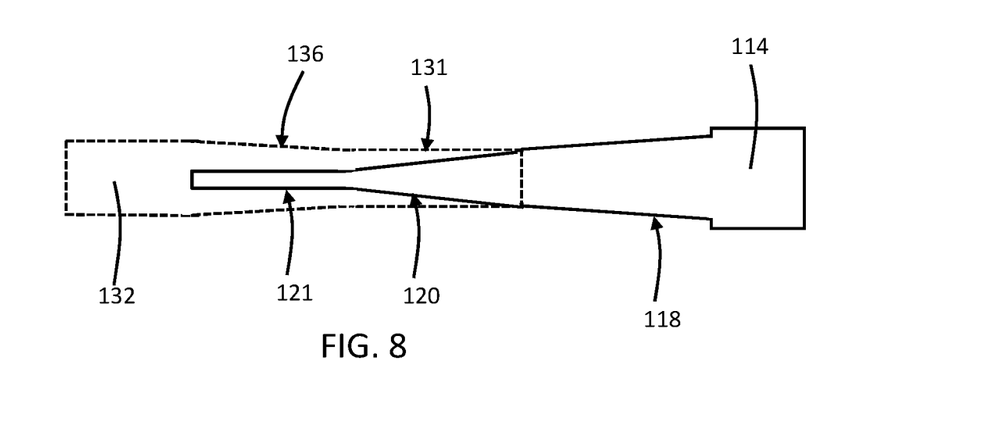

With reference to FIG. 8 in which like reference numerals refer to like features in FIG. 7 and in accordance with alternative embodiments of the invention, the straight section 121 of the waveguide 114 may be appended to the taper 120 such that the straight section 121 terminates the waveguide 114. Similarly, the waveguide 132 may be modified to add a straight section 131 appended to the taper 136 and that terminates the waveguide 114. In the cascaded arrangement, the taper 120 of waveguide 114 is arranged along the longitudinal axis 115 over the straight section 131 of the waveguide 132, and the taper 136 of the waveguide 132 is arranged along the longitudinal axis 135 under the straight section 121 of the waveguide 114. A similar arrangement of features is provided between the taper 120 at the opposite end of waveguide 114 and the taper 136 terminating waveguide 134.

In an alternative embodiment, the waveguide 114 may include an added bend similar to bend 42 (FIG. 2C) connected with one or both of the tapers 120 such that each added bend terminates the waveguide 114. In an alternative embodiment, one or both of the waveguides 132, 134 may include a bend similar to bend 44 (FIG. 2C) that is connected with the taper 136. Each added bend may have a positive curvature or a negative curvature.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. In the latter case, the chip is mounted in a single chip package (e.g., a plastic carrier, with leads that are affixed to a motherboard or other higher level carrier) or in a multichip package (e.g., a ceramic carrier that has either or both surface interconnections or buried interconnections). In any case, the chip may be integrated with other chips, discrete circuit elements, and/or other signal processing devices as part of either an intermediate product or an end product.

References herein to terms such as "vertical", "horizontal", "lateral", etc. are made by way of example, and not by way of limitation, to establish a frame of reference. Terms such as "horizontal" and "lateral" refer to a direction in a plane parallel to a top surface of a semiconductor substrate, regardless of its actual three-dimensional spatial orientation. Terms such as "vertical" and "normal" refer to a direction perpendicular to the "horizontal" direction. Terms such as "above" and "below" indicate positioning of elements or structures relative to each other and/or to the top surface of the semiconductor substrate as opposed to relative elevation.

A feature "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a waveguide crossing including a first waveguide and a second waveguide oriented to intersect the first waveguide, the first waveguide extending lengthwise along a first longitudinal axis, the second waveguide extending lengthwise along a second longitudinal axis, and the second longitudinal axis oriented transverse to the first longitudinal axis such that the first waveguide and the second waveguide are oriented to orthogonally intersect with included right angles; and
a third waveguide arranged in a vertical direction relative to the waveguide crossing, the third waveguide including a portion having an overlapping arrangement with a first portion of the first waveguide,
wherein the first portion of the first waveguide includes a taper and a straight section, the third waveguide includes a taper and a straight section, the taper of the first waveguide is arranged to overlap with the straight section of the third waveguide, the taper of the third waveguide is arranged to overlap with the straight section of the first waveguide, the portion of the third waveguide and the first portion of the first waveguide are configured to transfer optical signals between the first waveguide and the third waveguide, the straight section of the first waveguide is arranged to terminate the first waveguide, the third waveguide is arranged in the vertical direction over the waveguide crossing, the waveguide crossing is comprised of a single-crystal semiconductor material, and the third waveguide is comprised of a dielectric material.

2. The structure of claim 1 wherein the single-crystal semiconductor material is single-crystal silicon, and the dielectric material is a nitride of silicon.

3. A structure comprising:
a waveguide crossing including a first waveguide and a second waveguide oriented to intersect the first waveguide, the first waveguide extending lengthwise along a first longitudinal axis, the second waveguide extending lengthwise along a second longitudinal axis, and the second longitudinal axis oriented transverse to the first longitudinal axis such that the first waveguide and the second waveguide are oriented to orthogonally intersect with included right angles; and a third waveguide arranged in a vertical direction relative to the waveguide crossing, the third waveguide including a portion having an overlapping arrangement with a first portion of the first waveguide, wherein the first portion of the first waveguide includes a taper and a straight section, the third waveguide includes a taper and a straight section, the taper of the first waveguide is arranged to overlap with the straight section of the third waveguide, the taper of the third waveguide is arranged to overlap with the straight section of the first waveguide, the portion of the third waveguide and the first portion of the first waveguide are configured to transfer optical signals between the first waveguide and the third waveguide, the straight section of the first waveguide is arranged to terminate the first waveguide, the waveguide crossing is arranged in the vertical direction over the third waveguide, the waveguide crossing is comprised of a dielectric material, and the third waveguide is comprised of a single-crystal semiconductor material.

4. The structure of claim 3 wherein the dielectric material is nitride of silicon, and the single-crystal semiconductor material is single-crystal silicon.

* * * * *